(12) United States Patent
Ahmadun et al.

(10) Patent No.: US 9,145,316 B2
(45) Date of Patent: Sep. 29, 2015

(54) PROCESS FOR TREATING WASTEWATER

(75) Inventors: Fakhrul-Razi Ahmadun, Selangor Darul Ehsan (MY); Alireza Pendashteh, Selangor Darul Ehsan (MY)

(73) Assignee: Universiti Putra Malaysia, Selangor Darul Ehsan (MY)

( * ) Notice: Subject to any disclaimer, the term of this patent is extended or adjusted under 35 U.S.C. 154(b) by 920 days.

(21) Appl. No.: 13/003,233

(22) PCT Filed: Jul. 15, 2008

(86) PCT No.: PCT/MY2008/000070
§ 371 (c)(1),
(2), (4) Date: Apr. 7, 2011

(87) PCT Pub. No.: WO2010/008268
PCT Pub. Date: Jan. 21, 2010

(65) Prior Publication Data
US 2011/0180475 A1 Jul. 28, 2011

(51) Int. Cl.
*C02F 3/12* (2006.01)
*C02F 3/34* (2006.01)
*C02F 101/32* (2006.01)
*C02F 103/10* (2006.01)

(52) U.S. Cl.
CPC ............. *C02F 3/1263* (2013.01); *C02F 3/1268* (2013.01); *C02F 3/344* (2013.01); *C02F 3/34* (2013.01); *C02F 2101/32* (2013.01); *C02F 2103/10* (2013.01); *Y02W 10/15* (2015.05)

(58) Field of Classification Search
CPC ....... C02F 3/1263; C02F 3/1268; C02F 3/344
USPC .................................................. 210/626–628
See application file for complete search history.

(56) References Cited

U.S. PATENT DOCUMENTS 5,250,185 A 10/1993 Tao et al.
5,308,491 A * 5/1994 Hauck et al. .................. 210/614
(Continued)

FOREIGN PATENT DOCUMENTS

GB 1466530 A * 3/1977
GB 2 320 492 A 6/1998
(Continued)

OTHER PUBLICATIONS

International Search Report dated Nov. 4, 2008 (Three (3) pages).
(Continued)

*Primary Examiner* — Chester Barry
(74) *Attorney, Agent, or Firm* — Crowell & Moring LLP

(57) ABSTRACT

The present invention relates to a process for treating wastewater. The process includes the steps of (a) mixing different constituents of said wastewater inside a container, (b) withdrawing said wastewater from container, (c) feeding said wastewater to a bioreactor, (d) contacting said wastewater with an isolated microorganism or an isolated microorganism consortium, (e) aerating a suspension of said wastewater with said isolated microorganism or said isolated microorganism consortium, (f) withdrawing said suspension of said wastewater with said isolated microorganism or said isolated microorganism consortium from said bioreactor, (g) filtering receiving flow from step (f) to separate a concentrate stream from a permeate stream, (h) returning said concentrate stream to said bioreactor and (i) removing permeate stream.

9 Claims, 3 Drawing Sheets

(56) References Cited

U.S. PATENT DOCUMENTS

| | | |
|---|---|---|
| 5,558,774 A | 9/1996 | Tonelli et al. |
| 6,054,050 A | 4/2000 | Dyke |
| 6,117,333 A | 9/2000 | Frankiewicz et al. |
| 6,971,238 B1 | 12/2005 | Walker |
| 7,153,430 B2 * | 12/2006 | Tunnacliffe et al. .......... 210/620 |
| 7,329,532 B2 * | 2/2008 | Perriello ....................... 435/262 |
| 2005/0109694 A1 | 5/2005 | You et al. |
| 2006/0108283 A1 * | 5/2006 | Johnson et al. ............... 210/626 |
| 2006/0163155 A1 * | 7/2006 | Chauzy et al. ................ 210/605 |
| 2007/0102359 A1 * | 5/2007 | Lombardi et al. ............ 210/639 |
| 2007/0138070 A1 | 6/2007 | Dimitriou et al. |
| 2007/0275450 A1 | 11/2007 | Roberts et al. |
| 2007/0289923 A1 | 12/2007 | Ikebe et al. |
| 2008/0296220 A1 * | 12/2008 | Fry et al. ....................... 210/610 |
| 2009/0101572 A1 * | 4/2009 | Sullivan et al. ............... 210/601 |
| 2010/0006511 A1 * | 1/2010 | Walterick et al. ............. 210/735 |
| 2010/0038310 A1 * | 2/2010 | Shafer et al. .................. 210/605 |
| 2012/0152830 A1 * | 6/2012 | Shafer et al. .................. 210/605 |

FOREIGN PATENT DOCUMENTS

| | | |
|---|---|---|
| WO | WO 99/43622 A1 | 9/1999 |
| WO | WO 2006/137808 A1 | 12/2006 |

OTHER PUBLICATIONS

International Preliminary Report on Patentability (Form PCT/IPEA/409) including Form PCT/IPEA/416 and Amended Sheets (Seven (7) pages).

* cited by examiner

PROCESS FOR TREATING WASTEWATER

This application is a national stage of PCT International Application No. PCT/MY2008/000070, filed Jul. 15, 2008, the entire disclosure of which is herein expressly incorporated by reference.

FIELD OF INVENTION

The present invention relates to a process for treating wastewater.

BACKGROUND OF INVENTION

In crude oil and natural gas production process, wastewater (produced water) is produced in large quantities. Mccormack et al. in Mccormack, P., Jones, P., Hetheridge, M. J. and Rowland, S. J. (2001). Analysis of oilfield wastewaters and Production chemicals by electrospray Ionisation multi-stage mass spectrometry (ESI-MSn), Water Reserch. 35(15), 3567-3578 have reported that Wastewater normally contains high concentrations of total n-alkane (TNA), polycyclic aromatic hydrocarbons (PAHs), minerals, radioactive substances, benzenes and phenols.

Extraction technology and reservoir characteristics affect the amount of wastewater production. Campos, J. C., Borges, R. M. H., Oliveira Filho, A. M., Nobrega, R., Sant'Anna Jr, G. L. (2002). Oilfield wastewater treatment by combined microfiltration and biological processes, Water Research, 36, 95-104 have reported that in some sites the volume of wastewater produced may be tenfold the quantity of oil production. It can be estimated that wastewater production in Malaysia is around 5 million barrels per day.

In recent years researchers have concentrated on biological treatment of salty wastewaters specially oilfield wastewater and various prior art documents are available to demonstrate this.

For an example, in US Patent Application published as US20070275450, a culture capable of reducing perchlorate and nitrate in brine solution containing at least 30 g/L NaCl under anaerobic/anoxic conditions was used to demonstrate biological process. In U.S. Pat. No. 6,971,238 B1, an evaporation method used to create steam from wastewater.

In U.S. Pat. No. 6,117,333 an oxidant, ferric ions, and flocculent were used to remove hydrocarbons, arsenic and mercury for treatment of wastewater. This chemical treatment needs high amounts of chemicals.

In U.S. Pat. No. 6,054,050, a process for removing soluble and insoluble organic and inorganic contaminants from refinery wastewater streams employing ultrafiltration and reverse osmosis was provided. To remove divalent and trivalent metal cations prior to being passed to the reverse osmosis a sequential chemical softening system employed to prevent fouling.

In U.S. Pat. No. 5,250,185 to treat oilfield wastewaters, containing boron and solubilized hydrocarbon compounds to reduce boron concentration, a combined method comprising water softening to remove substantially all divalent cations, raising the pH of the liquid above about 9.5, and driving the liquid through a reverse osmosis membrane was used.

As reported in Freire, D. D. C., Cammarota, M. C. and Sant'Anna Jr, G. L. (2000). Biological treatment of oil field wastewater in a sequencing batch reactor, Environmental Technology, 22, 1125-1135, an effluent containing a mixture of oil field wastewater and sewage in different percentages with acclimatized activated sludge microorganisms was treated. In some tests they used a cotton cloth to retain part of the oil and grease in raw wastewater. With 2000 mg/l average Chemical Oxygen Demand (COD) of raw wastewater, maximum removal efficiency was around 70%.

Teller, G. I., Nirmalakhandan, N. and Gardea-Torresdey, J. (2002); Performance evaluation of an activated sludge system for removing petroleum hydrocarbons from oilfield wastewater. Advances in Environmental Research, 6, 455-470 have reported using an activated sludge unit utilizing indigenous microorganisms in a treatment system consisting a skimming and pre-aeration unit followed by biological treatment system. The COD of wastewater from 431±25 mg/l has reduced to 35±11 mg/l and 14±7 mg/l after biological treatment, and clarifier/filtration respectively.

As reported in Zhao, X., Wang, Y., Ye, Z., Borthwick, A., and Ni, J. (2006). Oil field wastewater treatment in Biological Aerated Filter by immobilized microorganisms, Process Biochemistry. 41, 1475-1483, Zhao et al. have investigated the use of B350M and B350 commercial microorganisms (Biosystems Co.) immobilized on carriers in a pair of Biological Aerated Filter (BAF) to treat wastewater. The COD and TOC of influent wastewater was 124 mg/l and 38 mg/l. Effluent TOC for 13350M and B350 was 8.1 mg/l and 13.3 mg/l respectively.

As reported in Li, Q., Kang C., Zhang, C. (2005). Waste water produced from an oilfield and continuous treatment with an oil-degrading bacterium, Process Biochemistry. 40, 873-877, Li et al. 2005 used *Bacillus* sp. (M-12) immobilized on polyvinyl alcohol in a continuous wastewater treatment system and cinder column as a final filtration. The COD of the influent decreased from 2600 mg/l to 240 mg/l. Campos et al. 2002 used combined microfiltration as a pretreatment and air-lift biological reactor. Results of biodegradation tests showed that the COD removal efficiency of raw wastewater was about 60% and after microfiltration was 87%. The COD of raw wastewater, after microfiltration and after biological treatment was 2250 mg/l, 1350 mg/l and 230 mg/l respectively.

Funston et al, 2002 as reported in Funston, R., Ganesh, R., and Leong Lawrence Y. C. (2002) Evaluation of technical and economic feasibility of treating oilfield wastewater to create a "New" water resource. Ground Water Protection Council (GWPC) Meeting used a pilot unit consisting of warm softening, coconut shell filtration, cooling (fin-fan), trickling filter, ion exchange and reverse osmosis for treating low IDS (6000 mg/l) wastewater. TOC of raw wastewater decreased from 120 mg/l to 12-24 mg/l after trickling filter.

In most treatment methods, wastewater was physically and chemically pre-filtered before feeding to a biological unit. Microfiltration, skimming and coconut shell filtration were used as physical treatment and warm softening and coagulant were used as chemical treatment. In most of researches proposed treatment methods can not reduce high COD concentration of wastewater (COD more than 2000 mg/l) to less than 200 mg/l, as a result effluent can not meet DOE limits also fluctuation of COD in effluent is very high.

As illustrated above, discharge of wastewater even after treatment using currently available treatment processes has caused pollution to soil, waterways and underground water.

Therefore, it is an object of the present invention to provide a process without any chemical and physical pretreatment, and flexible enough to handle different feed characteristics and easier operation than other biological processes. It is another object of the present invention to provide a process to treat wastewater without large fluctuations in effluent and therefore meet discharge limit standards.

SUMMARY OF INVENTION

Accordingly, there is provided a process includes the steps of (a) mixing different constituents of said wastewater inside a container, (b) withdrawing said wastewater from container, (c) feeding said wastewater to a bioreactor, (d) contacting said wastewater with an isolated microorganism or an isolated microorganism consortium, (e) aerating a suspension of said wastewater with said isolated microorganism or said isolated microorganism consortium, (f) withdrawing said suspension of said wastewater with said isolated microorganism or said isolated microorganism consortium from said bioreactor, (g) filtering receiving flow from step (f) to separate a concentrate stream from a permeate stream, (h) returning said concentrate stream to said bioreactor and (i) removing permeate stream.

The present invention consists of several novel features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF THE DRAWINGS

For the purpose of facilitating and understanding of the present invention, there is illustrated in the accompanying drawings, from an inspection of which, when considered in connection with the following description, the invention, its construction and operation and many of its advantages would be readily understood and appreciated.

DETAILED DESCRIPTION OF THE PREFERRED EMBODIMENTS OF INVENTION

Figure 1:
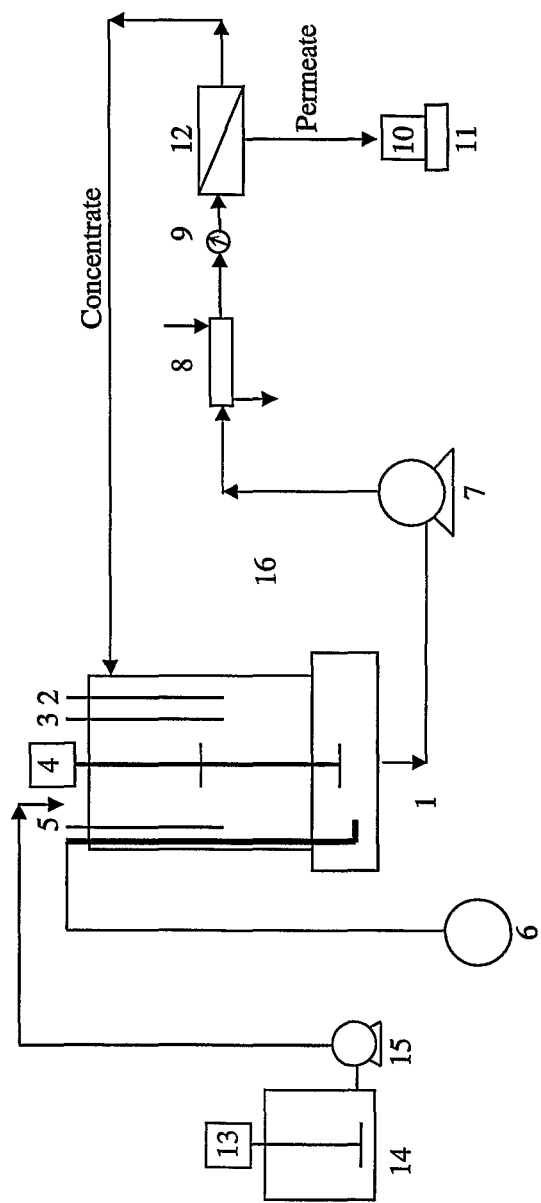
FIG. 1 is a simplified schematic diagram of experimental setup of a membrane-bioreactor of process.

The present invention relates to a process for treating wastewater. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

Generally, the present invention relates to a process to treat oilfield wastewater in a sequencing batch bioreactor under aerobic condition for the degradation of hydrocarbon pollutants present in wastewater (hypersaline wastewater from oilfield activities). An isolated tropical halophilic microorganism consortium culture capable of biodegrading crude oil in wastewater was used to demonstrate the biological process. High quality effluent wastewater is separated from suspended solids which are removed from the bioreactor and fed to a membrane.

A process is disclosed to treat synthetic oilfield wastewater in a sequencing batch reactor under aerobic condition to reduce the concentration of hydrocarbon contaminant (emulsified or non-emulsified) from wastewater, such as that co-produced during oil and gas production. It has been discovered that the operation of a bioreactor system including an aerobic bioreactor inoculated with tropical halophilic microorganism culture in combination with a membrane filtration device will successfully remove hydrocarbon contaminants in synthetic oilfield wastewater.

In this process an isolated tropical halophilic microorganism consortium culture capable of biodegrading crude oil in brine containing at least 3.5% w/v total dissolved solids was used to demonstrate the biological process. A membrane with a low pressure was used to retain sludge in bioreactor and remove large hydrocarbon components.

It is also found that in the process of the present invention, emulsified and non-emulsified hydrocarbon droplets are removed from the wastewater with a total sequencing time of around 24 hours.

The present invention relates particularly to a process for isolating a suitable halophilic microorganism consortium from tropical hypersaline environment and using the microorganisms in a sequencing batch reactor biological treatment combined a membrane to treat wastewater generated in oil and gas extraction industries.

The process to treat oilfield wastewater is provided in a Sequencing Batch Reactor (SBR) bioreactor combined with membrane (MSBR). Such wastewater contains waste fluids which are a mixture of minerals (especially NaCl), total n-alkane (TNA), polycyclic aromatic hydrocarbons (PAHs), radioactive substances, benzenes and phenols.

Because of high Total Dissolved Solid (TDS) concentration in hypersaline environment of wastewater (at least 3.5% w/v total dissolved solids), indigenous and natural tropical halophilic microorganism consortium was isolated and bioreactor was inoculated with it. Hypersaline soil from marine sediment in Malaysia served as a source of tropical halophilic microorganisms.

The MSBR was operated for 32 days with a total sequencing of around 24 hours. COD and oil and grease concentration after membrane were less than 100 ppm and 10 ppm which meet authorities' limits; also fluctuation of effluent concentration was very low.

Figure 2:
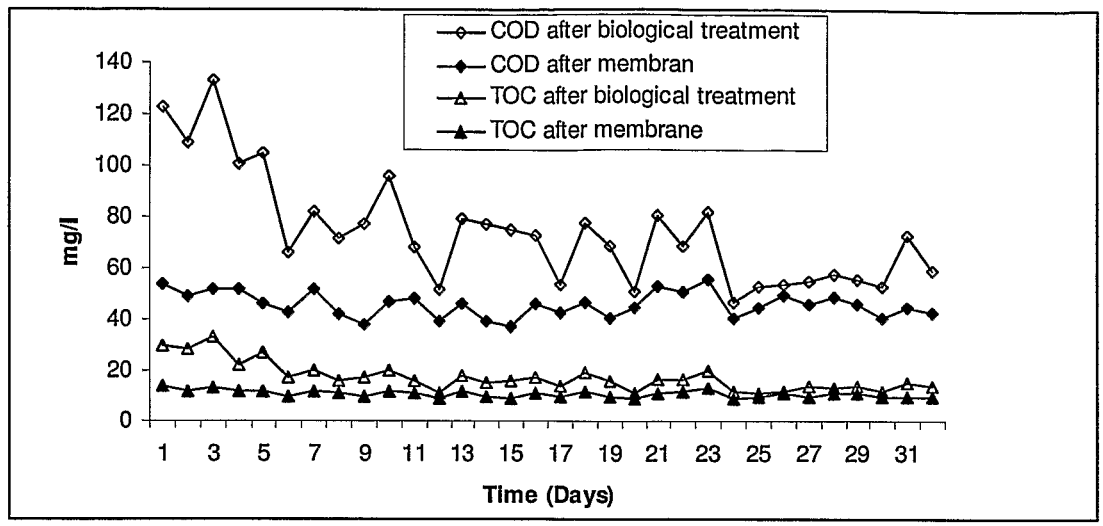
FIG. 2 is a graph showing variation of TOC and COD after biological treatment and membrane over nearly one month of study.
Figure 3:
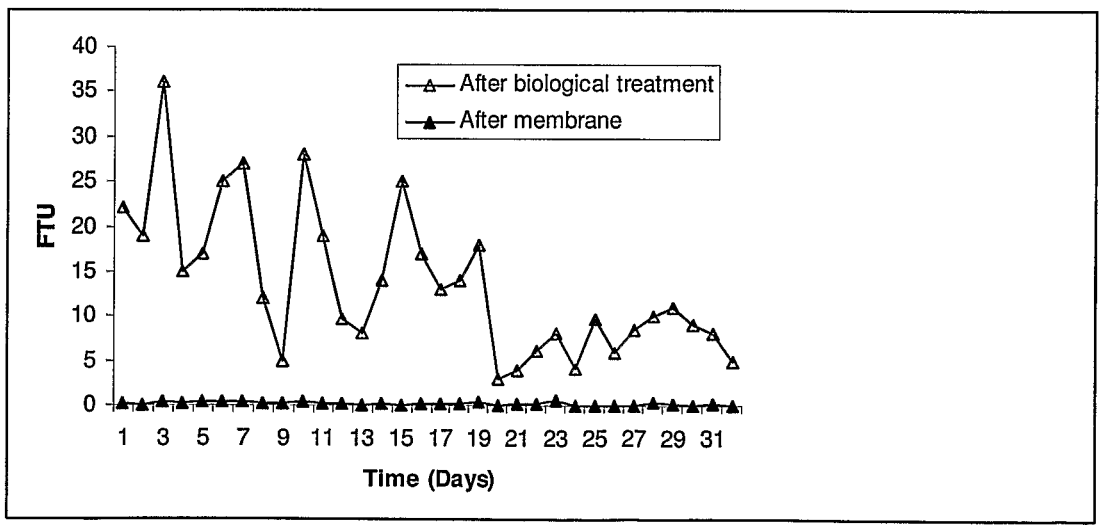
FIG. 3 is a graph showing variation of turbidity after biological treatment and membrane over nearly one month of study.
Figure 4:
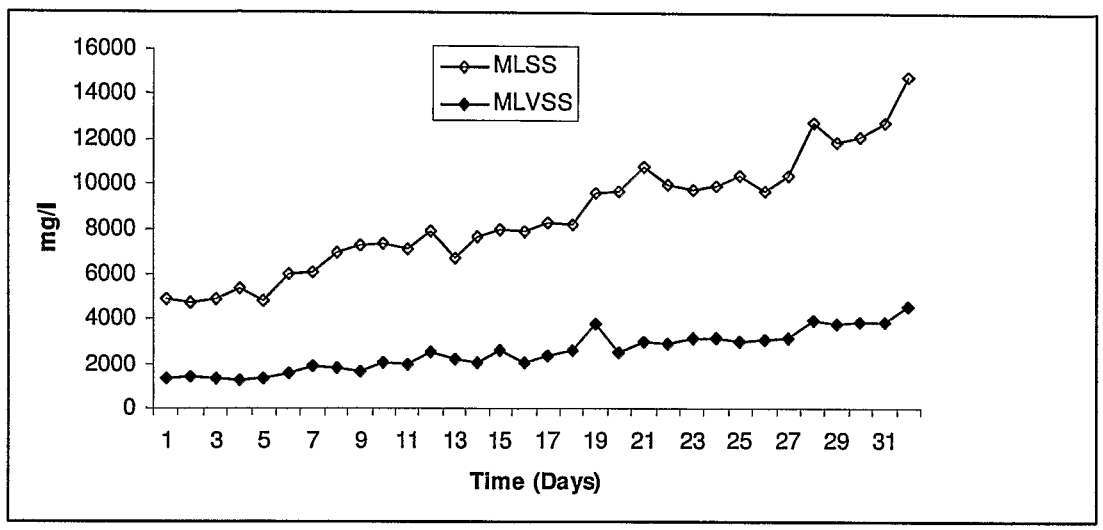
FIG. 4 is a graph showing variation of MLSS-MLVSS with time over nearly one month of study.

FIG. 1 is a simplified schematic diagram of experimental setup of a membrane-bioreactor of process. FIG. 2 is a graph showing variation of TOC and COD after biological treatment and membrane over nearly one month of study. FIG. 3 is a graph showing variation of turbidity after biological treatment and membrane over nearly one month of study. FIG. 4 is a graph showing variation of MLSS-MLVSS with time over nearly one month of study. The drawings will now be referred individually or collectively in the following description.

Wastewater Preparation

Based on halophilic medium, wastewater was simulated. Wastewater was prepared by mixing the constituents in a propylene container for around 24 hours in a homogenizer to achieve equilibrium between the oil and water phases.

Characteristics of synthetic wastewater were as follows:
TDS: 35000 mg/l to 40000 mg/l
TOC: 550 mg/l to 600 mg/l
COD: 2200 mg/l to 2500 mg/l
Oil and grease: 200-250 mg/l
Turbidity 230 FTU to 270 FTU Culture Selection A culture developed for biological degradation of crude oil in hypersaline condition of synthetic wastewater. Hypersaline soil from Marin sediment in Malaysia served as a source of tropical halophilic microorganisms. Isolation of microorganism consortium capable of degrading crude oil in synthetic wastewater began by placing soil into synthetic wastewater. After few days of mixing on a shaker table (150 rpm, 28° C. to 32° C.) a 2 ml sample of the mixture was transferred to a fresh medium. After few steps of the process, the resulting mixture was free of soil.

Description of Operation

The membrane bioreactor system is intended to treat synthetic oilfield wastewater generated in oil and gas exploration and extraction. It is another general object of this invention to provide a process without any physical and chemical pretreatment, flexible to feed characteristics, easy to operation and an inexpensive operational cost process comprising, (1) aerating of wastewater mixture in bioreactor in the presence of isolated natural halophilic microorganism consortium which can degrade hydrocarbon components in hypersaline conditions very effective with a total sequencing of around 24 hours; (2) feeding the content of bioreactor to membrane; (3) recycling concentrate to bioreactor; (4) retaining solids and large hydrocarbon compound in bioreactor and (5) production high quality permeate to meet DOE limits for discharge to environment.

Referring to FIG. 1 there is shown a bioreactor 1 which was used as sequencing batch reactor biological system. Dissolved Oxygen (DO) 5, pH 2, aeration 6, temperature 3 and agitation 4 was microprocessor controlled. The bioreactor 1 contains an aqueous suspension of isolated tropical halophilic microorganism consortium. The bioreactor operated in atmospheric pressure. Oxygen is provided by air pump 6 and air diffuser inside the fermenter to maintain dissolved oxygen 2-3 mg/l. The bioreactor includes baffles to increase contacting wastewater with the microorganisms. Components of wastewater are mixed in a propylene container 14 with mixer 13 for around 24 hours and synthetic wastewater is fed to fermenter by pump 15. During feeding the wastewater air pump inject air to supply oxygen. After feeding, aeration is continued. The contents of fermenter 1 is withdrawn through pump 7 and discharge as a pressurized line to membrane 12 after aeration period. Table 1 shows operating conditions of the system. The membrane unit 16 contains membrane module 12, positive displacement pump 7, pressure gage 9, and heat exchanger 8. The membrane can be used in the pH range from 1.5-12 and maximum operating pressure of 10 bar. The membrane unit has a heat exchanger system 8 in order to maintain the temperature constant at 28° C. to 32° C. Permeate 10 flux was measured gravimetrically with a electronic balance 11.

The term pump used in the text should be understood to encompass all kinds of pumps, preferably positive displacement pumps and more preferably peristaltic pumps.

TABLE 1

| Operating conditions of the process | |
| --- | --- |
| Cycle time (h) | around 24 |
| Dissolved oxygen (mg/Lit) | 2-3 |
| Temperature (° C.) | 28-32 |

During filtration operation concentrate is returned to bioreactor and permeate is collected in permeate line. During 32 days operation of coupled system results showed that maximum TOC and COD after biological treatment and membrane separation were 33 mg/l, 133 mg/l and 14 mg/l, 56 mg/l respectively. Also the average percent TOC and COD removal were 96.9 and 96.7. On the other hand, minimum TOC and COD after biological treatment and membrane separation were 11 mg/l, 47 mg/l and 9 mg/l, 37 mg/l respectively. The removal efficiency of coupled system was 98% for both TOC and COD and more than 95% for oil and grease. The MLSS concentration had increased from 4700 mg/l to 14800 mg/l and a proportional increase of MLVSS from 1500 mg/l to 4590 mg/l was also observed.

TABLE 2

| Operational results for coupled system | | | | | |
| --- | --- | --- | --- | --- | --- |
| TOC (mg/l) After bioreactor | TOC (mg/l) After membrane | COD (mg/l) After bioreactor | COD (mg/l) After membrane | Turbidity (FTU) After bioreactor | Turbidity (FTU) After membrane |
| Minimum 11 | 9 | 47 | 37 | 3 | 0 |
| Maximum 33 | 14 | 133 | 56 | 36 | 0.5 |
| Average 17 | 11 | 74 | 46 | 13 | 0.15 |

Membrane Unit Performance

In order to reduce solids deposition and provide self-cleaning mechanisms on the membrane surface, a low pressure operating pressure was chosen during the one month study. Upon start-up of the membrane system, the membrane flux of the unit was approximately 115 L/m$^2$·h. The flux declined to 60 L/m$^2$·h after 1.5 hours running and then decreased gradually. During this work the membranes were cleaned with alkali and acid solutions before the flux decrease to 40 L/m$^2$·h.

Finally, the described system operation led to the conclusion that sequencing batch reactor biological treatment inoculated with isolated tropical hypersaline microorganism consortium coupled with membrane can treat oilfield wastewater effectively to reduce TOC, COD and oil and grease contaminant parameters to meet DOE limit and the treated wastewater can be discharge to environment. The invented process which is described in detail can provide a low operational cost and effective solution to wastewater problem without any restriction to raw wastewater characteristics.

The process of invention results in a cleaned and treated wastewater having relatively low concentration of contaminant, e.g., less than 100 ppm of COD and 10 ppm oil and grease from more than 2000 ppm and 200 ppm in the raw wastewater.

It has been discovered that the wastewater generated in oilfield can be treated successfully without the need to do physical and chemical pretreatment. Also the concentration of pollutants in the final effluent is nearly constant.

In addition, the process of the present invention does not need physical and chemical pretreatment also it is flexible to feed characteristics and its operation is easier than other biological processes. Therefore, the invention may be used as an inexpensive method for treating wastewater.

The invention claimed is:

1. A process of treating wastewater by degrading hydrocarbon pollutants, said process includes steps of:
   (a) mixing hypersaline wastewater inside a container wherein the mixing is assisted by a mixer, preferably a turbo mixer for around 24 hours;
   (b) feeding the wastewater of step (a) into a bioreactor;
   (c) contacting the wastewater of step (b) with a halophilic isolated microorganism or a halophilic isolated microorganism consortium available in the bioreactor, wherein the halophilic isolated microorganism or the halophilic isolated microorganism consortium is capable of degrading the hydrocarbon pollutants;
   (d) aerating the wastewater of step (c) with the isolated microorganism or the isolated microorganism consortium;
   (e) filtering the wastewater of step (d) to separate a concentrate stream from a permeate stream using a membrane filtration system;

(f) returning the concentrate stream of step (e) to the bioreactor; and (g) collecting the permeate stream of step (e) via a permeate line.

2. The process according to claim 1, wherein the wastewater in step (b) is fed using a pump.

3. The process according to claim 1, wherein the wastewater is aerated with said isolated microorganism or said isolated microorganism consortium in step (d) using a pump.

4. The process according to claim 3, wherein the pump is a positive displacement pump.

5. The process according to claim 1, wherein the bioreactor is aerated to maintain a dissolved oxygen level of 2-3 mg/l.

6. The process according to claim 1, wherein the membrane is maintained at temperature of 28-32° C.

7. The process according to claim 1, wherein the wastewater has at least 3.5% w/v total dissolved solids.

8. The process according to claim 1, wherein the bioreactor operates as a sequencing batch reactor.

9. The process according to claim 1, wherein wastewater is produced by oil and gas industries.

\* \* \* \* \*